(12) United States Patent
Stambek

(10) Patent No.: US 8,534,925 B1
(45) Date of Patent: Sep. 17, 2013

(54) DIFFERENTIAL BEARING SYSTEM FOR AN AXLE ASSEMBLY

(71) Applicant: American Axle & Manufacturing, Inc., Detroit, MI (US)

(72) Inventor: Joel G. Stambek, Decatur, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/624,343

(22) Filed: Sep. 21, 2012

(51) Int. Cl.
*F16C 23/00* (2006.01)
*F16C 25/00* (2006.01)

(52) U.S. Cl.
USPC .................................................... 384/583

(58) Field of Classification Search
USPC ................. 384/519, 537, 540, 542, 563, 583; 475/230
See application file for complete search history.

(56) References Cited

U.S. PATENT DOCUMENTS

| | | | |
|---|---|---|---|
| 1,372,624 A * | 3/1921 | Leipert | 384/583 |
| 1,669,725 A * | 5/1928 | Scribner | 384/583 |
| 3,001,842 A | 9/1961 | Boyd | |
| 3,239,285 A * | 3/1966 | Madeira et al. | 384/583 |
| 5,269,731 A | 12/1993 | Scudder et al. | |
| 6,398,689 B1 | 6/2002 | Morse et al. | |
| 6,474,873 B1 * | 11/2002 | Krisher et al. | 384/563 |
| 7,282,006 B2 * | 10/2007 | Petruska et al. | 475/230 |
| 7,485,065 B2 | 2/2009 | Kearney | |
| 7,794,153 B2 | 9/2010 | Szczepanski et al. | |
| 2006/0276298 A1 | 12/2006 | Rodgers et al. | |

* cited by examiner

*Primary Examiner* — Phillip A Johnson
(74) *Attorney, Agent, or Firm* — Harness, Dickey & Pierce, P.L.C.

(57) ABSTRACT

An axle assembly with an axle housing, a case, a bearing, a hollow bearing adjuster and a locking system. The bearing is received onto a bearing hub on the case and supports the case for rotation relative to a bulkhead structure in the axle housing. The bearing adjuster has a threaded portion, which is threaded to the axle housing, and an inboard end surface that is abutted against an outboard bearing race of the bearing. The locking system inhibits relative rotation between the axle housing and the bearing adjuster. The locking system consists of a threaded hole in the bulkhead structure, a plurality of circumferentially spaced apart adjustment apertures formed in the bearing adjuster and a threaded fastener that is threadably received into the threaded hole. The threaded fastener extends into one of the adjustment apertures.

20 Claims, 5 Drawing Sheets

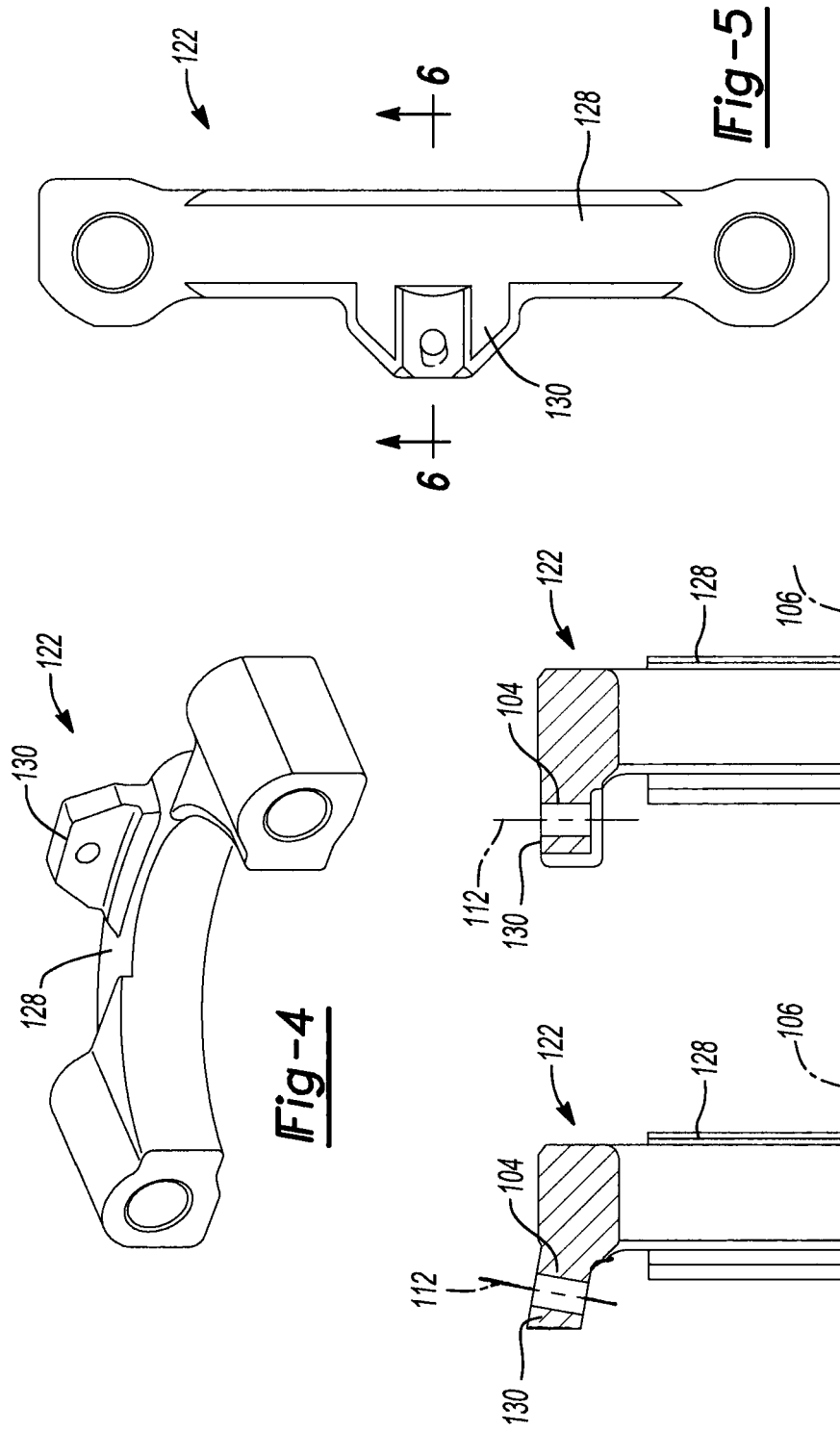

DIFFERENTIAL BEARING SYSTEM FOR AN AXLE ASSEMBLY

INTRODUCTION

The present invention generally relates to a differential bearing system for an axle assembly.

Automotive axle assemblies typically include an axle housing, an input pinion that is mounted in the axle housing for rotation about a first axis, a differential that is mounted in the axle housing for rotation about a second axis and a ring gear that is mounted to the differential and meshingly engaged to the input pinion. Many of these axle assemblies further include a differential bearing system that can include a pair of differential bearings and a pair of threaded bearing adjusters. The differential bearings can support the differential for rotation on the axle housing, while the threaded bearing adjusters are configured to be rotated relative to another component to permit the differential bearings (and therefore the differential) to be positioned along the second axis and/or to apply a desired amount of preload to the differential bearings.

A locking system is typically employed to inhibit movement of the threaded bearing adjuster relative to another structure (e.g., the axle housing). Exemplary locking systems are disclosed in U.S. Pat. Nos. 3,001,842; 6,398,689; 7,485,065 and 7,794,153, as well as in U.S. Publication No. 2006/0276298. Such locking systems typically comprise a clip that engages the threaded bearing adjuster, and may include a fastener for retaining the clip to the axle housing. While such differential bearing systems are suited for their intended use, there nonetheless remains a need in the art for an improved differential bearing system.

SUMMARY

In one form the present teachings provide an axle assembly having a case, a bearing, an axle housing, a hollow bearing adjuster and a locking system. The case has a bearing hub. The bearing has an inner race, which is mounted on the bearing hub, and an outer race. The axle housing has a bulkhead structure that defines a bearing seat and a threaded adjuster bore. The outer race is mounted to the bearing seat to support the bearing hub for rotation relative to the axle housing about a rotational axis. The threaded adjuster bore is disposed outboard of the bearing seat. The hollow bearing adjuster has a threaded portion and an inboard end surface. The threaded portion is threadably engaged to the threaded adjuster bore. The inboard end surface is abutted against the outboard bearing race. The locking system inhibits relative rotation between the axle housing and the bearing adjuster. The locking system consists entirely of a threaded hole in the bulkhead structure, a plurality of circumferentially spaced apart adjustment apertures formed in the bearing adjuster and a threaded fastener that is threadably received into the threaded hole. The threaded fastener extends into one of the adjustment apertures. The threaded hole is disposed along a fastener axis that is not perpendicular to the rotational axis.

In another form the present teachings provide an axle assembly having a case, a pair of bearings, an axle housing, a pair of hollow bearing adjusters and a pair of fasteners. The case has a pair of bearing hubs. Each bearing has an inner race, which is mounted on a corresponding one of the bearing hubs, and an outer race. The axle housing has a pair of bulkhead structures. Each bulkhead structure defines a bearing seat, a threaded adjuster bore and a threaded hole. Each of the outer races is mounted to a corresponding one of the bearing seats to support the case for rotation relative to the axle housing about a rotational axis. Each bearing adjuster has a threaded portion, an inboard end surface and a plurality of circumferentially spaced apart adjustment apertures. Each threaded portion is threadably engaged to a corresponding one of the threaded adjuster bores and is disposed between the inboard end surface and the adjustment apertures. Each of the inboard end surfaces is abutted against a corresponding one of the outboard bearing races. Each threaded fastener is threadably received into a corresponding one of the threaded holes and extends into one of the adjustment apertures in a corresponding one of the bearing adjusters Each of the threaded holes is disposed along a fastener axis that is not perpendicular to the rotational axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a perspective view of a portion of the rear axle assembly illustrating a bearing cap in more detail;

FIG. 5 is rear elevation view of the bearing cap;

FIG. 6 is a section view taken along the line 6-6 of FIG. 5;

FIG. 7 is a section view similar to that of FIG. 6 but illustrating the bearing cap with a threaded hole that is oriented along a fastener axis that is intended to be generally perpendicular to the rotational axis of a differential assembly.

DETAILED DESCRIPTION OF THE VARIOUS EMBODIMENTS

Figure 1:
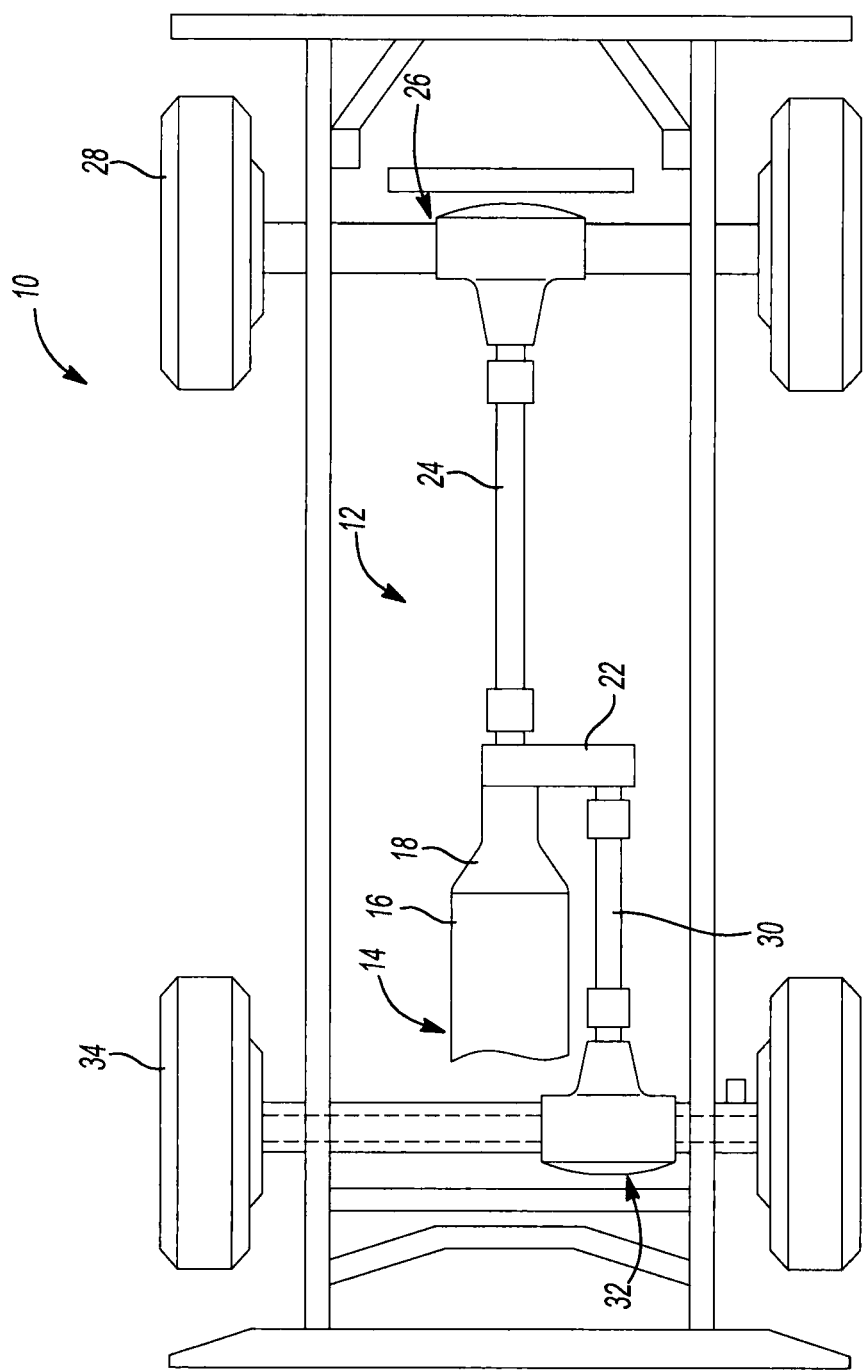
FIG. 1 is a schematic illustration of a vehicle having an axle assembly (i.e., a rear axle assembly) constructed in accordance with the teachings of the present disclosure.

With reference to FIG. 1 of the drawings, a vehicle having an axle assembly (e.g., rear axle assembly 26) constructed in accordance with the teachings of the present disclosure is generally indicated by reference numeral 10. The vehicle 10 can include a driveline 12 that is powered (i.e., driven) by a power train 14. The power train 14 can include an engine 16 and a transmission 18. The driveline 12 can include a transfer case 22 or other power distributing device, a rear propshaft 24, a rear axle assembly 26, a plurality of rear wheels 28, a front propshaft 30, a front axle assembly 32 and a pair of front wheels 34. The engine 16 can be mounted in an in-line or longitudinal orientation along the longitudinal axis of the vehicle 10 and its output can be coupled to the input of the transmission 18 in a conventional manner to transmit rotary power (i.e., drive torque) therebetween. The transmission 18 can include an output and a gear reduction unit that can be employed to couple the transmission input to the transmission output at a selected gear or speed ratio.

The transfer case 22 can be a conventional transfer case and can be coupled to the transmission 18 configured to transmit rotary power to the rear axle assembly 26 and the front axle assembly 32 in a desired manner. For example, the transfer case 22 can be operable in a first mode in which rotary power is transmitted only to the rear axle assembly 26 and in a second mode in which drive torque is allocated between the rear and front axle assemblies 26 and 32 in a predetermined manner.

The rear propshaft 24 is conventional and couples a rear output of the transfer case 22 to an input of the rear axle assembly 26. The rear wheels 28 are coupled to and driven by the rear axle assembly 26 in a conventional manner. The front propshaft 30 is conventional and couples a front output of the transfer case 22 to the front axle assembly 32, which can be constructed in a manner that is similar to the rear axle assembly 26. The front wheels 34 are coupled to and driven by the front axle assembly 32.

Figure 2:
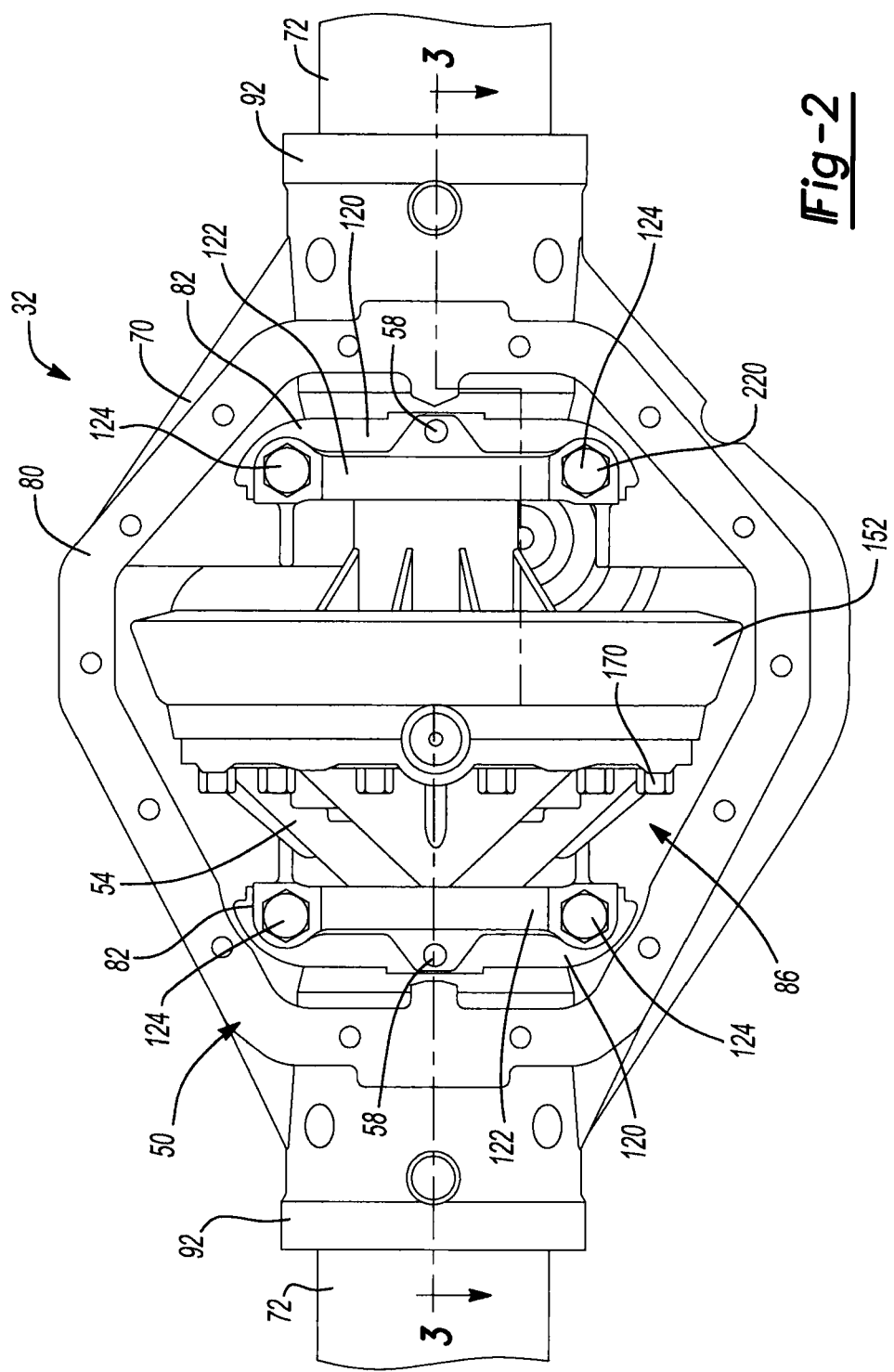
FIG. 2 is a rear elevation of a portion of the vehicle of FIG. 1 illustrating a portion of the rear axle assembly in more detail.
Figure 3:
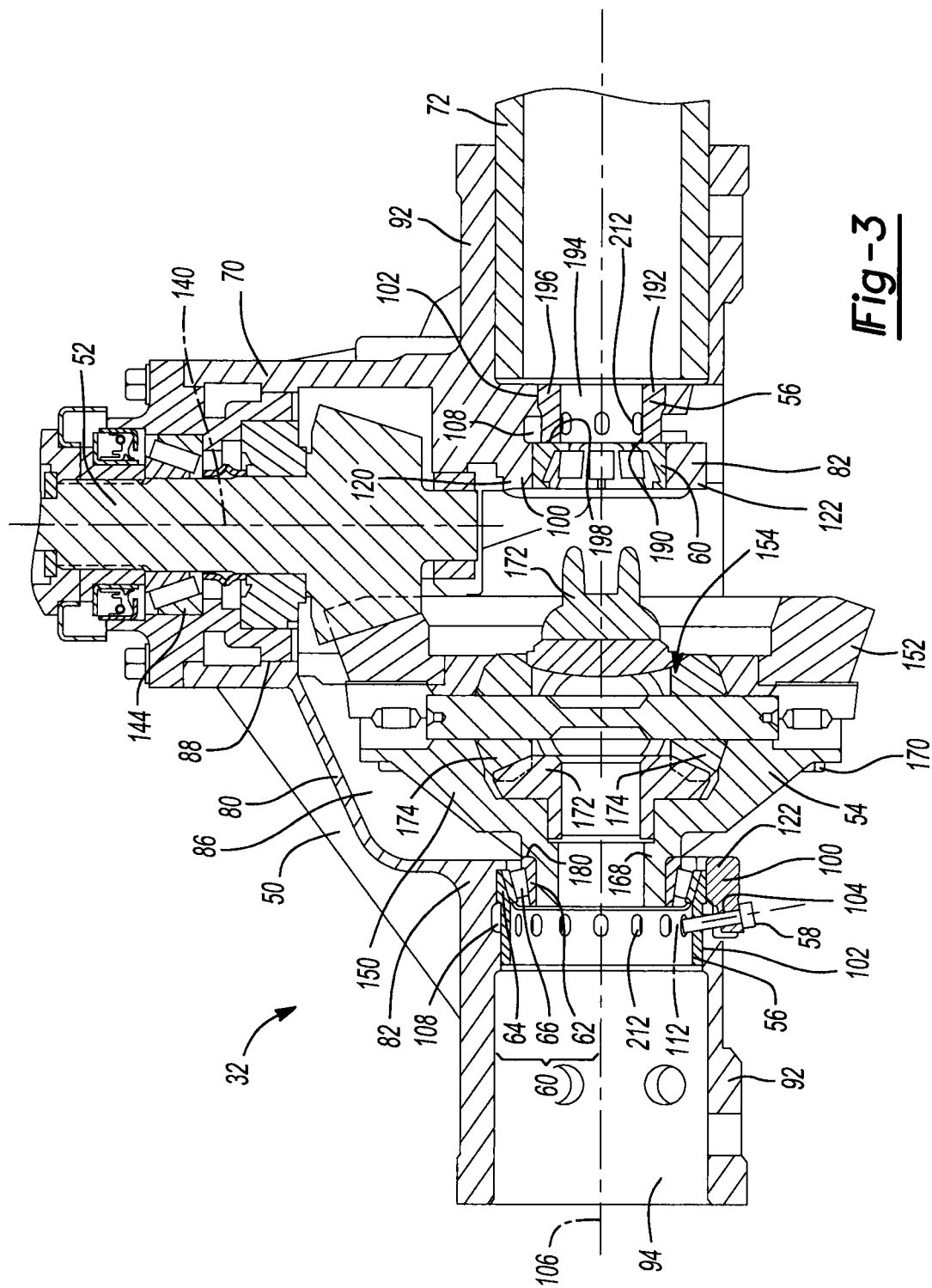
FIG. 3 is a sectional view taken along the line 3-3 of FIG. 2.

With reference to FIGS. 2 and 3, the rear axle assembly 26 can include an axle housing 50, a pinion 52, a differential assembly 54, a pair of bearing adjusters 56, a pair of threaded fasteners 58 and a pair of differential bearings 60, each of which having an inner bearing race 62, an outer bearing race 64, and a plurality of bearing elements 66 disposed between the inner and outer bearing races 62 and 64. The axle housing 50 can include a carrier housing 70 and a pair of axle tubes 72. For clarity, one of the axle tubes is not shown in FIG. 3.

The carrier housing 70 can include a wall member 80 and a pair of bearing bulkhead structures 82. The wall member 80 can define a cavity 86 as well as a pinion bore 88 and a pair of collars 92 that can define respective axle tube bores 94. The bearing bulkhead structures 82 can be disposed in the cavity 86 and interconnected to the wall member 80. Each bearing bulkhead structure 82 can define a bearing seat 100, a threaded adjuster bore 102 and a threaded hole 104. The bearing seats 100 can define a rotational axis 106 around which the differential assembly 54 can be rotatably mounted. If desired, an annular groove 108 can be formed into each bearing bulkhead structure 82 between the bearing seat 100 and the threaded adjuster bore 102. The threaded adjuster bore 102 can be disposed on an outboard side of an associated one of the bearing seats 100. The threaded hole 104 can be spaced apart from the bearing seat 100 and can be oriented along a respective fastener axis 112 (only one shown) that can be disposed relative to the rotational axis 106 at a desired angle. In the particular example provided, the fastener axis 112 is not perpendicular to the rotational axis 106 but rather tipped so that both the fastener axes 112 and the rotational axis 106 are contained in a single plane and the fastener axes 112 converge toward one another with decreasing distance toward the rotational axis 106.

Figure 8:
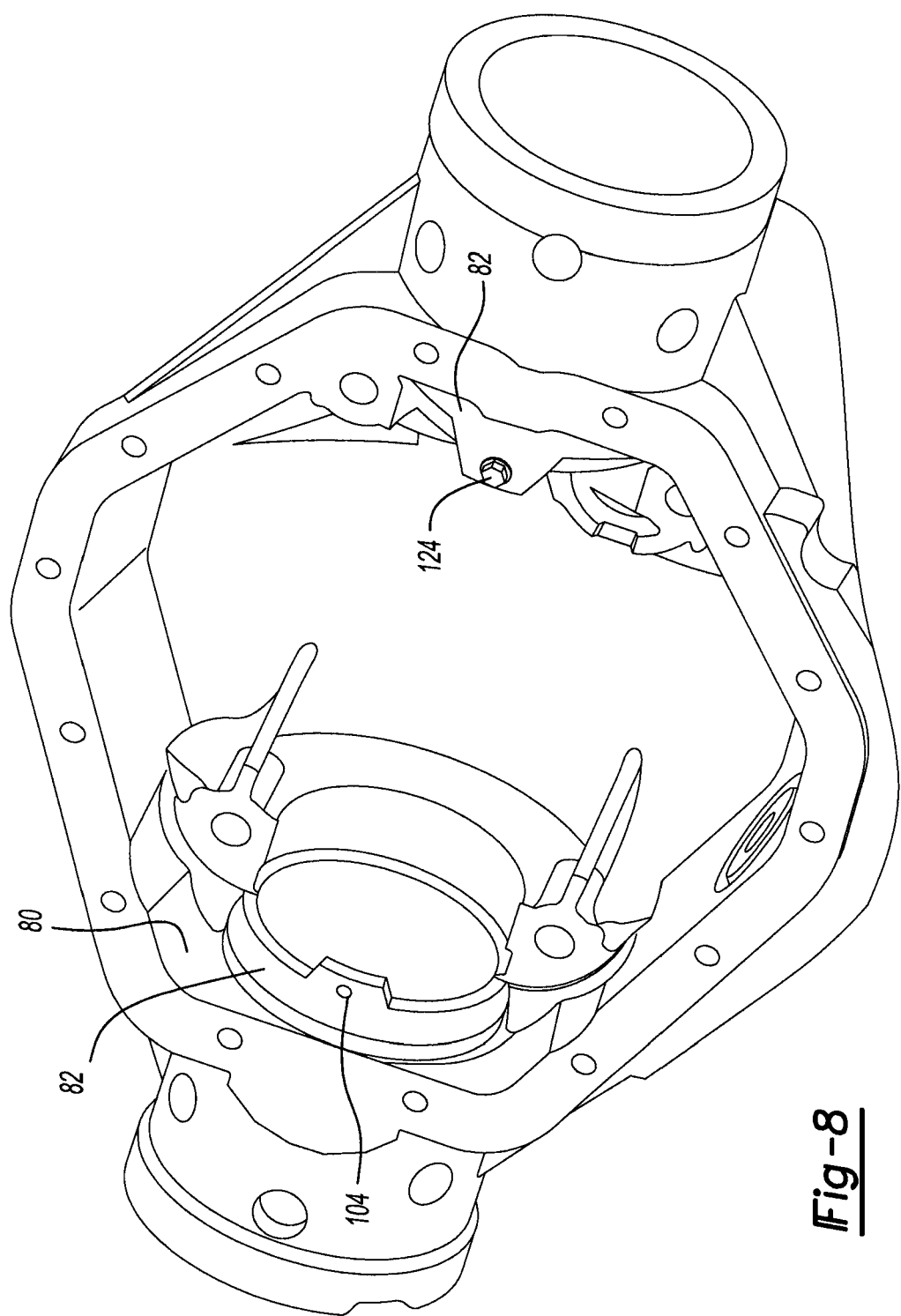
FIG. 8 is a perspective view of a portion of another axle assembly constructed in accordance with the teachings of the present disclosure.

If desired, the bearing bulkhead structures 82 can be unitarily and integrally formed with and non-removably coupled to the wall member 80 as is shown in FIG. 8. In the particular example provided, each bearing bulkhead structure 82 includes a bearing bulkhead 120, which is unitarily and integrally formed with the wall member 80, and a bearing cap 122 through which the threaded hole 104 extends. A pair of threaded fasteners 124 are employed to fixedly but removably couple the bearing cap 122 to its associated bearing bulkhead 120. With reference to FIGS. 4 through 6, the bearing cap 122 can include a generally U-shaped cap structure 128 and a tab 130 that can extend to a side of the cap structure 128, such as an outboard side. The threaded hole 104 can be formed in the tab 130. Alternatively, the fastener axis 112 can be aligned generally perpendicular to the rotational axis 106 as is shown in FIG. 7. The tab 130 can be formed to extend from the remainder of the bearing cap 122 in any desired manner and can be shaped as desired. In the example of FIG. 6, the tab 130 extends from the remainder of the bearing cap 122 in a direction that is generally perpendicular to the fastener axis 112 and includes an outboard end having a side or face that is generally perpendicular to the rotational axis 106. In the example of FIG. 7, the tab 130 extends from the remainder of the bearing cap 122 in a manner that is generally parallel to the rotational axis 106 and perpendicular to the fastener axis 112.

Returning to FIGS. 2 and 3, the pinion bore 88 can be disposed about a second axis 140 that can be generally perpendicular to the rotational axis 106. The pinion 52 can be received in the pinion bore 88 and supported on pinion bearings 144 for rotation about the second axis 140.

Each axle tube 72 can be a hollow, tubular structure that can be received into a respective one of the collars 92. If desired, the axle tubes 72 can engage the collars 92 in a press-fit or interference-fit manner. Slug welds (not shown) can be employed to inhibit axial and rotational movement of the axle tubes 72 relative to the carrier housing 70.

With reference to FIG. 3, the differential assembly 54 can include a differential case 150, a ring gear 152, and a means for dividing power between a pair of output members, such as a gear set 154. The differential case 150 can define a case cavity 164, into which the gear set 154 is received, and a pair of bearing hubs 168 (only one shown). The ring gear 152 can be coupled to the differential case 150 by any suitable means, such as laser welding or via a plurality of threaded fasteners 170 (FIG. 2). The gear set 154, which can include a pair of side gears 172 and a pair of pinion gears 174, can be received in the case cavity 164. The bearing hubs 168 can be generally tubular projections formed onto the opposite sides of the differential case 150. Each of the inner bearing races 62 can be mounted on a corresponding one of the bearing hubs 168 and abutted against a shoulder 180 defined by the bearing hub 168.

Each bearing adjuster 56 can include a body portion 190, an adjustment portion 192 and a longitudinally extending bore 194 that can be formed longitudinally through the bearing adjuster 56. The body portion 190 can include an externally threaded portion 196 and an inboard end surface 198. The threaded portion 196 is sized to be threadably received in the threaded adjuster bore 102 such that the inboard end surface 198 is abutted against the outer bearing race 64. The adjustment portion 192 can include a plurality of circumferentially spaced apart adjustment apertures 212. The adjustment apertures 212 can be configured to be engaged by a tool (not shown) to rotate the bearing adjusters 56 to both preload the differential bearings 60, as well as to set the lash between the pinion 52 and the ring gear 152 and/or a desired gear tooth contact pattern. For example, the adjustment apertures 212 can be slotted apertures that can be formed entirely through the bearing adjusters 56 and that can extend longitudinally in a direction that is generally parallel with the rotational axis 106.

Each threaded fastener 58 can threadably engage one of the threaded holes 104 and can extend into an adjustment aperture 212 in an associated one of the bearing adjusters 56 to thereby inhibit rotation of the bearing adjusters 56 relative to the bearing bulkhead structures 82. Each threaded fastener 58 can comprise a head 220, which is adapted to be engaged by a tool (not shown) to tighten the threaded fastener 58 against the bearing bulkhead structure 82. It will be appreciated that the head 220 can be abutted directly against the bearing bulkhead structure 82, or that in the alternative, a washer or spacer (not shown) could be disposed between the head 220 and the bearing bulkhead structure 82.

From the foregoing, those of skill in the art will appreciate from this disclosure that the threaded hole 104, the adjustment apertures 212 and the threaded fastener 58 cooperate to form a locking system for inhibiting relative rotation between the axle housing 50 and one of the bearing adjusters 56.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
   a case having a bearing hub;
   a bearing having an inner race and an outer race, the inner race being mounted on the bearing hub;
   an axle housing having a bulkhead structure that defines a bearing seat and a threaded adjuster bore, wherein the outer race is mounted to the bearing seat to support the bearing hub for rotation relative to the axle housing about a rotational axis, the threaded adjuster bore being disposed outboard of the bearing seat;
   a hollow bearing adjuster having a threaded portion and an inboard end surface, the threaded portion being threadably engaged to the threaded adjuster bore, the inboard end surface being abutted against the outboard bearing race; and
   a locking system for inhibiting relative rotation between the axle housing and the bearing adjuster, the locking system consisting entirely of a threaded hole in the bulkhead structure, a plurality of circumferentially spaced apart adjustment apertures formed in the bearing adjuster and a threaded fastener that is threadably received into the threaded hole, the threaded fastener extending into one of the adjustment apertures;
   wherein the threaded hole is disposed along a fastener axis that is not perpendicular to the rotational axis.

2. The axle assembly of claim 1, wherein the threaded fastener comprises a head and a washer, the washer being abutted against the head and the bulkhead structure.

3. The axle assembly of claim 1, wherein the threaded fastener comprises a head and wherein the head is abutted directly against the bulkhead structure.

4. The axle assembly of claim 1, wherein the bearing bulkhead structure is a one-piece, unitarily formed construction that is integrally formed with a remainder of the axle housing.

5. The axle assembly of claim 1, wherein the bearing bulkhead structure is a two-piece construction that includes a bulkhead member and a bearing cap that is fixedly but removably coupled to the bulkhead member.

6. The axle assembly of claim 1, wherein the threaded hole is formed in the bearing cap.

7. The axle assembly of claim 6, wherein the bearing cap comprises a cap structure and a tab that extends to a side of the cap structure, and wherein the threaded hole is formed in the tab.

8. The axle assembly of claim 1, wherein the bearing hub terminates at a shoulder and wherein the inner bearing race is abutted against the shoulder.

9. The axle assembly of claim 1, wherein the bulkhead structure further defines an annular groove disposed between the bearing seat and the threaded adjuster bore.

10. The axle assembly of claim 1, further comprising an axle tube that is received into a hollow collar in the axle housing.

11. An axle assembly comprising:
    a case having a pair of bearing hubs;
    a pair of bearings, each bearing having an inner race and an outer race, the inner race being mounted on a corresponding one of the bearing hubs;
    an axle housing having a pair of bulkhead structures, each bulkhead structure defining a bearing seat, a threaded adjuster bore and a threaded hole, wherein each of the outer races is mounted to a corresponding one of the bearing seats to support the case for rotation relative to the axle housing about a rotational axis;
    a pair of hollow bearing adjusters, each bearing adjuster having a threaded portion, an inboard end surface and a plurality of circumferentially spaced apart adjustment apertures, the threaded portion being threadably engaged to a corresponding one of the threaded adjuster bores, the threaded portion being disposed between the inboard end surface and the adjustment apertures, each of the inboard end surfaces being abutted against a corresponding one of the outboard bearing races; and
    a pair of threaded fasteners, each threaded fastener being threadably received into a corresponding one of the threaded holes and extending into one of the adjustment apertures in a corresponding one of the bearing adjusters;
    wherein the threaded hole is disposed along a fastener axis that is not perpendicular to the rotational axis.

12. The axle assembly of claim 11, wherein the threaded fastener comprises a head and a washer, the washer being abutted against the head and the bulkhead structure.

13. The axle assembly of claim 11, wherein the threaded fastener comprises a head and wherein the head is abutted directly against the bulkhead structure.

14. The axle assembly of claim 11, wherein the bearing bulkhead structure is a one-piece, unitarily formed construction that is integrally formed with a remainder of the axle housing.

15. The axle assembly of claim 11, wherein the bearing bulkhead structure is a two-piece construction that includes a bulkhead member and a bearing cap that is fixedly but removably coupled to the bulkhead member.

16. The axle assembly of claim 11, wherein the threaded hole is formed in the bearing cap.

17. The axle assembly of claim 16, wherein the bearing cap comprises a cap structure and a tab that extends to a side of the cap structure, and wherein the threaded hole is formed in the tab.

18. The axle assembly of claim 11, wherein the bearing hub terminates at a shoulder and wherein the inner bearing race is abutted against the shoulder.

19. The axle assembly of claim 11, wherein the bulkhead structure further defines an annular groove disposed between the bearing seat and the threaded adjuster bore.

20. The axle assembly of claim 11, further comprising an axle tube that is received into a hollow collar in the axle housing.

\* \* \* \* \*